United States Patent
Zhang et al.

(10) Patent No.: US 6,735,562 B1
(45) Date of Patent: May 11, 2004

(54) METHOD FOR ESTIMATING A CONFIDENCE MEASURE FOR A SPEECH RECOGNITION SYSTEM

(75) Inventors: Yaxin Zhang, Hurstville (AU); Ho Chuen Choi, West Pennant Hills (AU); Jian Ming Song, Kingsgrove (AU)

(73) Assignee: Motorola, Inc., Schaumburg, IL (US)

( * ) Notice: Subject to any disclaimer, the term of this patent is extended or adjusted under 35 U.S.C. 154(b) by 855 days.

(21) Appl. No.: 09/588,163

(22) Filed: Jun. 5, 2000

(51) Int. Cl.$^7$ .............................................. G10L 15/14
(52) U.S. Cl. ...................... 704/240; 704/252
(58) Field of Search ............................... 704/240, 252, 704/236, 238, 239

(56) References Cited

U.S. PATENT DOCUMENTS 5,323,337 A * 6/1994 Wilson et al. ................ 702/73
5,839,103 A * 11/1998 Mammone et al. ......... 704/232
6,185,528 B1 * 2/2001 Fissore et al. .............. 704/232

* cited by examiner

Primary Examiner—Richemond Dorvil
Assistant Examiner—Donald L. Storm
(74) Attorney, Agent, or Firm—Kenneth A. Haas

(57) ABSTRACT

A method of estimating a confidence measure for a speech recognition system, involves comparing an input speech signal with a number of predetermined models of possible speech signals. Best scores indicating the degree of similarity between the input speech signal and each of the predetermined models are then used to determine a normalized variance, which is used as the Confidence Measure, in order to determine whether the input speech signal has been correctly recognized, the Confidence Measure is compared to a threshold value. The threshold value is weighted according to the Signal to Noise Ratio of the input speech signal and according to the number of predetermined models used.

10 Claims, 3 Drawing Sheets

METHOD FOR ESTIMATING A CONFIDENCE MEASURE FOR A SPEECH RECOGNITION SYSTEM

FIELD OF THE INVENTION

This invention relates to a method for estimating a confidence measure for a speech recognition system, especially, though not exclusively, for a variable vocabulary speech recognition system.

BACKGROUND OF THE INVENTION

A fixed vocabulary speech recognition system, whether large vocabulary or limited vocabulary is one where the word that a speaker can utter is, in general, known in advance, whereas a variable vocabulary speech recognition system is one where the word or words that the speaker can utter are not known in advance, that is before the system is sold to the user. An example of a variable vocabulary speech recognition system is nametag voice dialing, where the names that the user will choose to store for voice dialing are completely unknown to the manufacturer.

As speech recognition systems are deployed in ever increasing numbers and situations, they need to be sufficiently flexible to cope with a wide range of user responses and behavior, including, for example, heavy accents, hesitations, pauses within words, false starts and other sounds such as "umm's" and "ah's". Other extraneous sounds, such as lip smacks and heavy breathing sounds, must also be taken into consideration, as well as environmental noises, especially background noises, such as talking, loud music, door closings and road noise in a car environment.

Another common problem is users speaking words that do not belong to the speech recognition system's vocabulary. This is commonly called an Out-Of-Vocabulary (OOV) problem. Without a verification strategy, a speech recognition system may choose the most likely pre-trained model as the recognition result.

Therefore, the speech recognition system must be able to determine whether the word that it chooses as being the most likely to be the word that the speaker actually uttered is truly "correct" or not. This "correctness" problem can be stated as a correspondence question between the output of the recognition system and the actual input utterance. The correspondence rule is specified by the requirements of the particular application, for example, a similar correspondence rule would not generally be used for both isolated word recognition and information retrieval systems, since in the former the correspondence should be between words, whereas for the latter the correspondence should be between meanings, i.e. by key word spotting. It is, of course highly desirable to maximize this correspondence, but, even with much effort being put into such systems to do so, nevertheless, every time a recognized word sequence is considered, there is, inherently, some degree of uncertainty regarding its "correctness". Therefore, it is desirable to build up a confidence measure of how close the recognized word sequence is to the input utterance, so that the recognition output can be considered as "correct" or "incorrect". The majority of incorrect recognitions by speech recognition systems are caused by the kinds of background noises mentioned above. A reliable speech recognition system should favor rejection of such improper recognition over an incorrect recognition result. After the rejection, the system should advise the user of the cause of the failure, and prompt the user to try again. It should be emphasized that the rejection of valid, but wrongly recognized keywords is very useful in many applications where the cost of misrecognition far exceeds the cost of rejection. For example, in voice tag recognition systems, dialing a wrong number should be avoided by rejecting a less confidently recognized result.

A typical confidence measure (CM) is a number between 0 and 1 which indicates the probability that the underlying word or utterance is recognized correctly. A value of CM=1 indicates that the system has perfect knowledge of which words are correct, whereas a value of CM=0 indicates that the system's recognition output is highly unreliable. An accurate determination of the confidence measure is therefore very useful in such systems to enable their outputs to be correctly interpreted as being likely to be correct or not.

Traditionally, a confidence measure has been calculated using one or a combination of garbage models and anti-keyword models. Garbage models and anti-keyword models often play an important role in the CM estimation, and they work very well in speaker-independent fixed-vocabulary speech recognition systems. The garbage models are normally trained by using a very large speech data collection which excludes the within-vocabulary words. The anti-keyword models are trained by using misrecognized speech utterances. To train the two types of models, prior knowledge of which words are included in the system's vocabulary is needed. However, in a variable-vocabulary speech recognition system, such as nametag voice dialing, such prior knowledge in unavailable. Therefore these well known types of models cannot be used to verify the recognition results.

BRIEF SUMMARY OF THE INVENTION

The present invention therefore seeks to provide a method for estimating a confidence measure for a speech recognition system which improves, at least in some cases on the methods of the prior art.

Accordingly, in a first aspect, the invention provides a method of estimating a confidence measure for a speech recognition system, the method comprising the steps of receiving an input utterance, comparing the input utterance with a plurality of predetermined models of possible utterances to provide a plurality of scores indicating a degree of similarity between the input utterance and the plurality of predetermined models, determining a variance of a predetermined number of the plurality of scores, and normalizing the variance to provide a confidence measure for the input utterance.

According to a second aspect, the invention provides a method of determining whether an input utterance to a speech recognition system is correctly recognized by the system or whether a recognition result is incorrect, the method comprising the steps of determining a likely recognition result for an input utterance, estimating a confidence measure for the likely recognition result utilizing the method described above, determining a threshold, comparing the threshold with the confidence measure, and accepting or rejecting the recognition result according to whether the confidence measure is above or below the threshold.

Preferably, the step of determining a threshold comprises weighting the threshold depending on the noise level in an input signal containing the input utterance. The threshold is preferably weighted according to a signal to noise ratio of the input signal. In a preferred embodiment, the weighting has a first value at low noise levels, a second value at high noise levels, and varies between the first and second levels at intermediate noise levels. Preferably, the first value is 1 when the signal to noise ratio of the input signal is greater than approximately 15, and the second value is 0 when the signal to noise ratio of the input signal is smaller than approximately 8. The weighting (W) is preferably given by:

$$W=(SNR-8)/7$$

for signal to noise ratio (SNR) values between approximately 8 and 15.

Preferably, the step of determining a threshold comprises weighting the threshold depending on the number of predetermined models that the input utterance is compared with. The weighting (W) is preferably given by $$W=0.6+1.08\times e-VS/10.0$$

where the number of predetermined models (VS) is 2 or more.

BRIEF DESCRIPTION OF THE DRAWINGS

One embodiment of the invention will now be more fully described, by way of example, with reference to the drawings, of which.

DETAILED DESCRIPTION OF THE DRAWINGS

Figure 1:
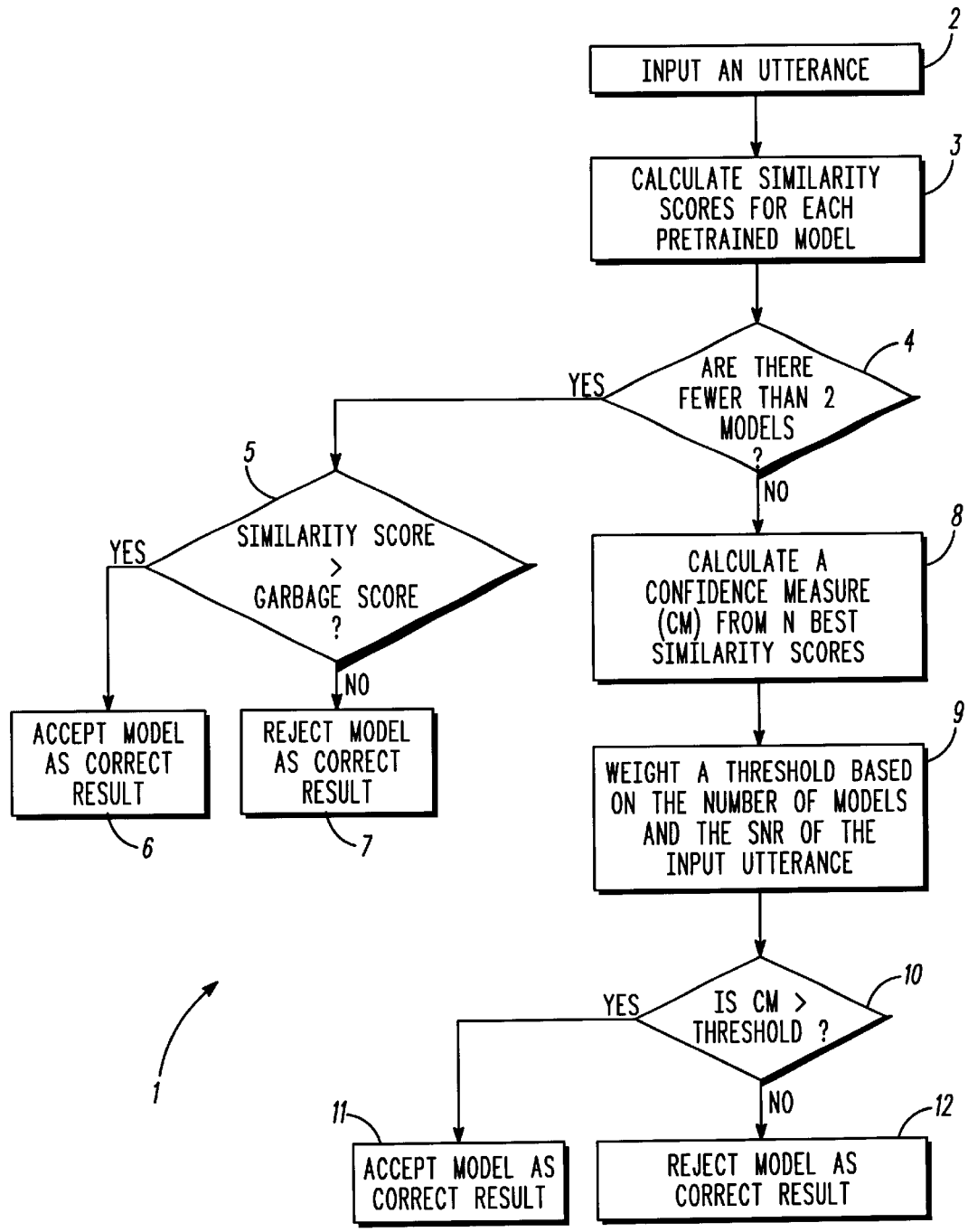
FIG. 1 shows a flow chart of a method for recognizing input speech utilising the method estimating a confidence measure according to one embodiment of the present invention.

Thus, as shown in FIG. 1, a method 1 for recognizing input speech utilising the method estimating a confidence measure according to one embodiment of the present invention involves receiving (step 2) an input signal comprising an input utterance. The basic concept of speech recognition is that the recognizer matches the input utterance with each pre-trained model in the system by means of a given measurement, and generates a similarity score for each model. The model that has the highest score will be the recognition result. This process is also known as searching. There are a number of searching strategies. Some of them only record the best score during the search, whereas others record all the scores and sort out the best after having searched through all the models. In the present case the latter search strategy, recording all the scores, is used to provide (step 3) a similarity score for each of the pre-trained models. Then the scores are sorted and the N-best are listed in order.

If there are fewer than two pre-trained models (step 4), for example, if a user has only trained one model so far, then the similarity score for that one pre-trained model is compared (step 5) to a garbage score. The garbage score is a measurement of the similarity of the input utterance to a garbage model, which has been pre-trained in the system by utilizing a large database of words. If the similarity score of the input utterance to the pre-trained model is greater than the garbage score, it is assumed that the pre-trained model is a correct identification of the input utterance and that pre-trained model is accepted (step 6) as the correct result. If, on the other hand, the similarity score of the input utterance to the pre-trained model is less than the garbage score, it is assumed that the pre-trained model is an incorrect identification of the input utterance and that pre-trained model is rejected (step 7) as the correct result.

If there are determined (step 4) to be two or more pre-trained models in the system, a confidence measure for the input utterance is calculated (step 8). The confidence measure (CM) is equivalent to the normalized variance of the N-Best scores, and is calculated by:

$$CM = \frac{1}{N}\sum_{i=1}^{N}\left(\frac{S_i - \mu}{\mu}\right)^2$$

where CM is the confidence measure, N is the number of N-Best scores, and will depend on the particular application, Si is the i-th best score, and p is the mean calculated by $$\mu = \frac{1}{N}\sum_{i=1}^{N} S_i$$

This confidence measure is generally valid for a system which has N or more pre-trained models. If the system has less than N pre-trained models, a decreased N should be considered. In the extreme case that the system has only one model, a less specified garbage model would be used. After the confidence measure is calculated, a rejection/acceptance decision must be made, as will be described further below.

Figure 2:
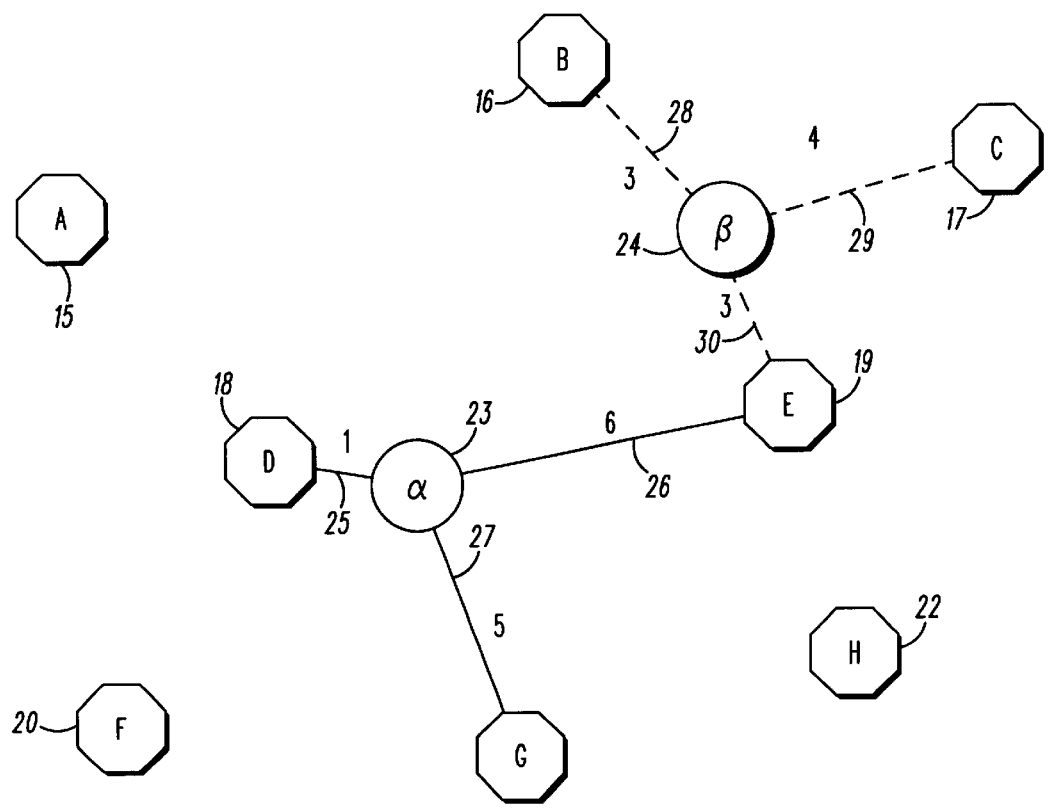
FIG. 2 shows schematically examples of input utterances and pre-trained models in a feature similarity space.

FIG. 2 illustrates how the normalized variance of the N-Best scores can be used as the confidence measure for the OOV (Out Of Vocabulary) rejection. Suppose there are eight pre-trained models A, B, C, D, E, F, G, and H represented by octagons 15–22, and two input speech utterances α and β represented by circles 23 and 24 in a feature space. If an input speech utterance is a word within the vocabulary, it should be close to one of the pre-trained models. Such an example is shown as the input utterance α which is close to the model D. On the other hand, an OOV utterance would not be close to any particular model. Such an example is shown as the input utterance β. For each input utterance, after calculating the distances (scores) between the input utterance and each of the pre-trained models, the three closest scores (smallest distances) are selected as the N-best scores. Of course, numbers other than 3 can be used as N, but for the purposes of this illustration, N is assumed to be prechosen to be 3. In FIG. 2, the three solid lines 25, 26 and 27 represent the N-best distances for the input utterance α, and the three dotted lines 28, 29 and 30 represent the N-best distances for the input utterance β. The numbers associated with each line indicate the length of the distances (degree of similarity). It can be seen that the variance of the distances between the input utterance a and the three closest models is larger than the variance for the input utterance β. In general, it will be apparent that variances for the within vocabulary utterances are larger than that for the OOV utterances. To remove the factor of absolute distances (scores), normalized variances are used, so that the confidence measure for the input utterance α is given by:

$$\mu_\alpha = \frac{1+6+5}{3} = 4$$

$$CM_\alpha = \frac{1}{3}\left[\left(\frac{1-4}{4}\right)^2 + \left(\frac{6-4}{4}\right)^2 + \left(\frac{5-4}{4}\right)^2\right] = \frac{7}{24}$$

Similarly, the confidence measure for the input utterance □ is given by:

$$\mu_\beta = \frac{3+3+4}{3} = \frac{10}{3}$$

$$CM_\beta = \frac{1}{3}\left[\left(\frac{3-\frac{10}{3}}{\frac{10}{3}}\right)^2 + \left(\frac{3-\frac{10}{3}}{\frac{10}{3}}\right)^2 + \left(\frac{4-\frac{10}{3}}{\frac{10}{3}}\right)^2\right] = \frac{1}{50}$$

Returning to FIG. 1, after the confidence measure is calculated, it is compared (In step 10) with a threshold value T. The threshold value T can be set so as to provide a false rejection rate of any desired figure, for example, 1% or 2.5%. However, variations in the false rejection rate, i.e. rejection of correctly recognized utterances, have been found to occur under different noise conditions and different vocabularies (numbers of pre-trained models). Therefore, in order to reduce the variation of false rejection due to different noise conditions, a weighting is applied to the threshold value T (step 9). The weighting method is based on the Signal to Noise Ratio (SNR) of the input signal. If the SNR is high, then the input utterance is more "clearly heard" by the system and the result is more likely to be correct than if the input utterance is masked by a lot of noise. Therefore, the weighting $W_{SNR}$ is calculated by:

| | |
|---|---|
| $W_{SNR} = 0$ | if SNR < a; |
| $W_{SNR} = (SNR-a)/(b-a)$ | if a <= SNR < b |
| $W_{SNR} = 1.0$ | if SNR >= b |

Figure 3:
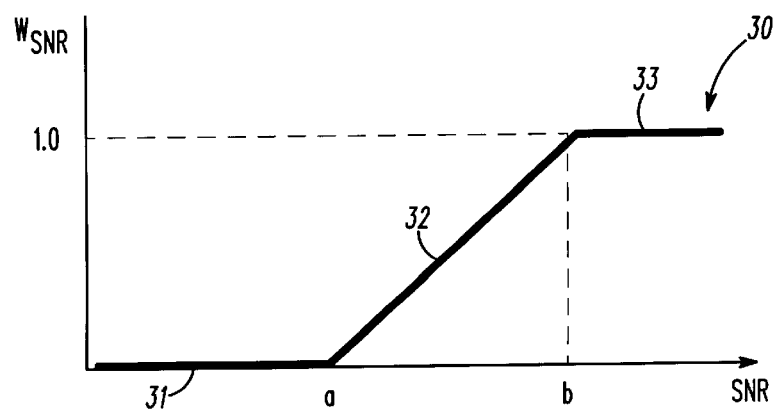
FIG. 3 shows a graph of a first weighting function used to adjust the threshold value in the method of FIG. 1.

This weighting function 30 is shown in FIG. 3, with $W_{SNR}$=0 for SNR from zero to a (shown at 31), $W_{SNR}$=1.0 for SNR above b (shown at 33), and $W_{SNR}$ being proportional to the increase in SNR from a to b (shown at 32). The values of a and b can be chosen for each particular application, but one example is for a=8.0 and b=15.0.

Figure 4:
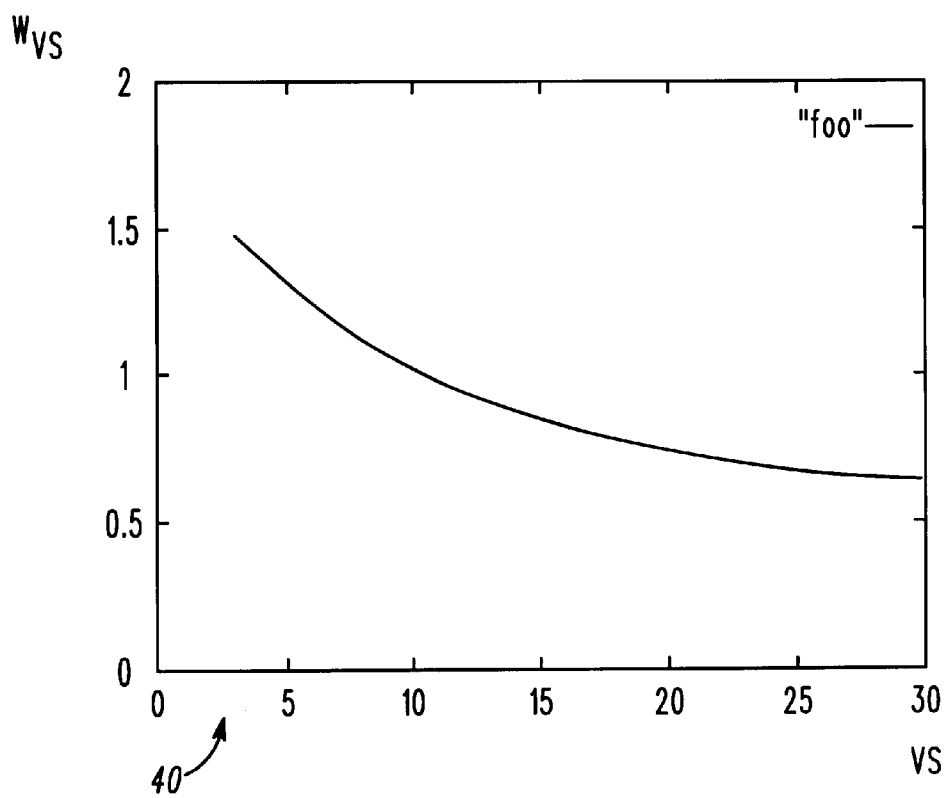
FIG. 4 shows a graph of a second weighting function used to adjust the threshold value in the method of FIG. 1.

As mentioned above, variations in the false rejection rate also occur depending on the number of pre-trained models present in the system. The reason is that, in general, when the system has more vocabularies (more models), the N-best scores of the models will be closer to each other. Therefore the CM (normalized variance) will be smaller. Thus, for a given threshold value, it can be seen that this causes more rejections, both false rejections of keywords and correct rejections of OOV words. Conversely, when the vocabulary size decreases, the system makes fewer rejections. Accordingly, the threshold value T is also weighted against vocabulary size by another weighting function $W_{VS}$:

$$W_{VS} = a + b \times e^{\frac{VS}{c}}$$

where VS is the vocabulary size, a, b and c are values that, again, can be chosen depending on the application. An example of suitable values are a=0.6, b=1.08 and c=10.0. FIG. 4 shows a graph 40 illustrating the function of $W_{VS}$ for different Vocabulary Sizes (VS) using these values of a, b and c.

Finally the weighted threshold Tw will be:

$$Tw = T \times W_{SNR} \times W_{VS}$$

Thus, returning to FIG. 1, after the threshold value is weighted (step 9), the CM is compared to the weighted threshold value Tw (step 10). If the CM greater than Tw, it is assumed that the pre-trained model which had the best score is a correct identification of the input utterance and that pre-trained model is accepted (step 11) as the correct result. If, on the other hand, the CM is less than TW, it is assumed that the pre-trained model is an incorrect identification of the input utterance and that pre-trained model is rejected (step 12) as the correct result.

It will be appreciated that although only one particular embodiment of the invention has been described in detail, various modifications and improvements can be made by a person skilled in the art without departing from the scope of the present invention.

We claim:

1. A method of estimating a confidence measure for a speech recognition system, the method comprising the steps of:

receiving an input utterance;

comparing the input utterance with a plurality of predetermined models of possible utterances to provide a plurality of scores indicating a degree of similarity between the input utterance and the plurality of predetermining models;

determining a variance of a predetermined number of the plurality of scores; and normalizing the variance to provide a confidence measure for a likely recognition result for the in put utterance, wherein the confidence measure (CM) is calculated by:

$$CM = \frac{1}{N}\sum_{i=1}^{N}\left(\frac{S_i - \mu}{\mu}\right)^2$$

where CM is the confidence measure, N is a predetermined number of N-Best scores, Si is the i-th best score, and $\mu$ is the mean calculated by:

$$\mu = \frac{1}{N}\sum_{i=1}^{N} S_i.$$

2. A method of determining whether an input utterance to a speech recognition system is correctly recognized by the system the method comprising the steps of:

determining a likely recognition result for an input utterance;

comparing the input utterance with a plurality of predetermined models of possible utterances to provide a plurality of scores indicating a degree of similarity between the input utterance and the plurality of predetermined models;

determining a variance of a predetermined number of the plurality of scores;

normalizing the variance to provide an estimated confidence measure for a likely recognition result for the input utterance;

determining a threshold comprising weighting the threshold depending on the noise level in an input signal containing the input utterance;

comparing the threshold with the confidence measure; and accepting or rejecting the recognition result according to whether the confidence measure is above or below the threshold.

3. A method according to claim 2, wherein the threshold is weighted according to a signal to noise ratio of the input signal.

4. A method according to claim 2, wherein the weighting has a first value at low noise levels, a second value at high noise levels, and varies between the first and second values at intermediate noise levels.

5. A method according to claim 4, wherein the weighting has a value of 1 when the signal to noise ratio of the input signal is greater then approximately 15.

6. A method according to claim 4, wherein the weighting has a value of 0 when the signal to noise ratio of the input signal is smaller than approximately 8.

7. A method according to claim 4, wherein the weighting (W) is given by $$W=(SNR-8)/7$$

for signal to noise ratio (SNR) values between approximately 8 and 15.

8. A method according to claim 2, wherein the step of determining a threshold comprises weighting the threshold depending on the number of predetermined models that the input utterance is compared with.

9. A method according to claim 8, wherein the weighting (W) is given by $$W' = \alpha + \beta \times e^{-VS/\gamma}$$

where the number of predetermined models (VS) is 2 or more.

10. A method according to claim 9, wherein $\alpha=0.6$;

$\beta=1.08$; and $\gamma=10.0$.

* * * * *